April 23, 1957  A. M. MAROTH  2,789,362
ELECTRICAL CLINOMETER
Filed Dec. 22, 1955
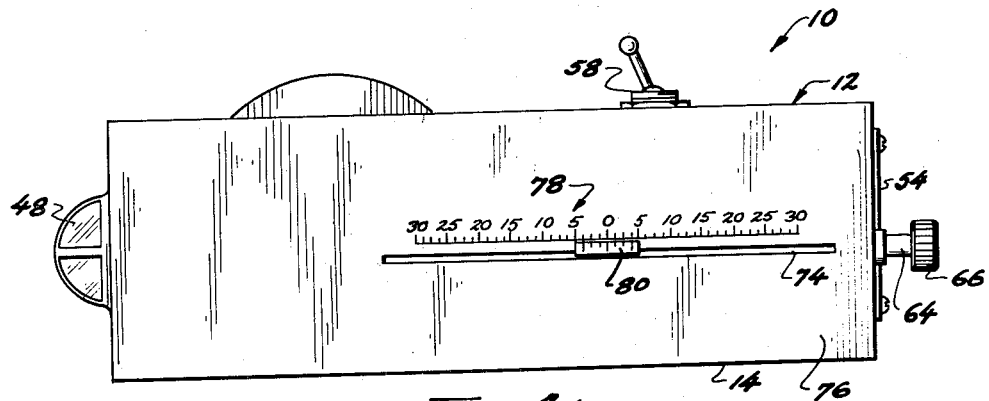
Fig. ~1~
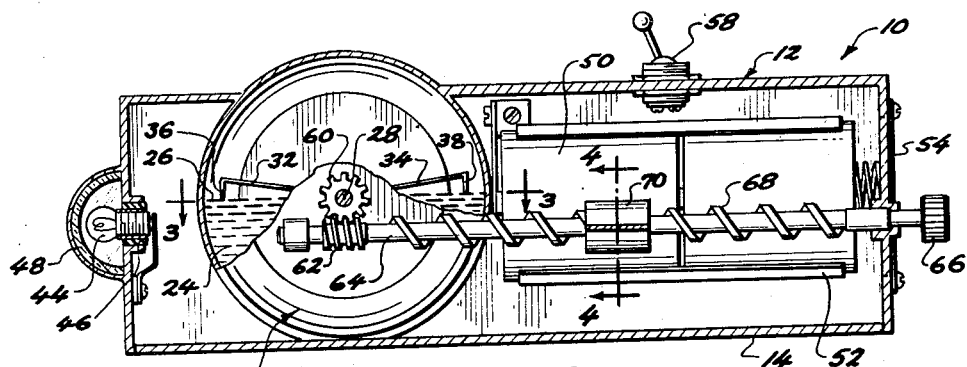
Fig. ~2~
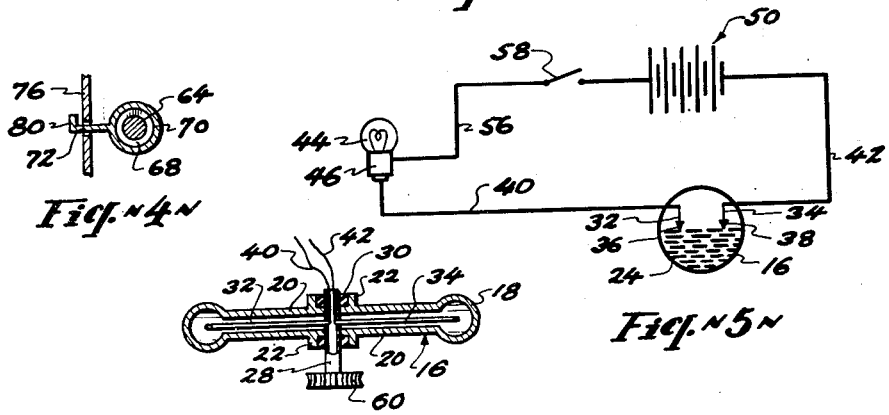
Fig. ~4~
Fig. ~5~
Fig. ~3~
INVENTOR.
ARTHUR M. MAROTH
BY
ATTORNEY.

United States Patent Office 2,789,362
Patented Apr. 23, 1957

2,789,362

ELECTRICAL CLINOMETER

Arthur M. Maroth, Wilton, Conn.

Application December 22, 1955, Serial No. 554,696

9 Claims. (Cl. 33—206)

The present invention relates generally to an electrical clinometer, that is, an instrument for indicating or checking the level or angle of a slope, elevation or inclination.

Heretofore, clinometers have usually comprised two straight arms pivotally connected at one end and associated with a protractor for indicating the angle included between the arms, and a spirit tube embodied in one of the arms so that, when the other arm is applied against the slope to be measured and the arms are angularly adjusted to center the bubble of the spirit tube between the usual index lines, the protractor will then indicate the angle of the slope. With such an arrangement, the accuracy of the indication depends upon the ability of the user to effect absolute centering of the bubble of the spirit tube between the index lines by angular adjustment of the arms, which requires a clear and unobstructed view of the spirit tube. However, the slope to be measured frequently is in a location that either prevents or makes difficult the required viewing of the spirit tube. Further, the area around the slope to be measured may be crowded and thereby prevent angular adjustment of the arms of the clinometer, particularly to the extent necessary for the measurement of large angles of slope or inclination.

Accordingly, it is an object of the present invention to provide an electrical clinometer for indicating or checking the level or angle of a slope, elevation or inclination, and that furnishes an easily observed signal, for example, the illumination of a light bulb, only when the setting and indication of the electrical clinometer exactly correspond to the level or angle of the slope being checked or measured.

Another object is to provide an electrical clinometer of increased accuracy, and that facilitates the adjustment thereof for the checking or measurement of different slopes or inclinations.

In an aspect of the invention an electrical clinometer includes a generally rectangular, elongated casing adapted to be applied against the surface to be checked or measured, a reservoir within the casing for containing a body of electrical conducting liquid, for example, mercury, having a free surface, an electrical circuit including a source of electrical current, a signal, for example, a light bulb, and two contacts disposed adjacent the free surface of the body of electrical conducting liquid to complete the circuit for energizing the signal only when both contacts are simultaneously immersed in the liquid by the conforming of the surface of the liquid with a line passing through both contacts, a rockable support for the contacts so that the angle between the longitudinal axis of the casing and the line passing through both contacts can be varied, mechanism for rocking the contact support, and indicating means associated with such mechanism and suitably calibrated to indicate the angle included between the line passing through the contacts and the longitudinal axis of the casing.

The above, and other objects, features and advantages of the invention will be apparent in the following detailed description of an illustrative embodiment thereof which is to be read in connection with the accompanying drawing forming a part hereof, and wherein:

Fig. 1 is a side elevational view of an electrical clinometer embodying the present invention;

Fig. 2 is an elevational view, similar to that of Fig. 1, but with the casing of the clinometer broken away and in section to expose the internal parts of the latter;

Fig. 3 is a horizontal sectional view taken along the line 3—3 of Fig. 2;

Fig. 4 is a fragmentary, vertical sectional view taken along the line 4—4 of Fig. 2; and Fig. 5 is a wiring diagram representing an electrical circuit included in the illustrated clinometer.

Referring to the drawing in detail, and initially to Figs. 1 and 2 thereof, an electrical clinometer embodying the present invention is there illustrated and generally identified by the reference numeral 10. The clinometer 10 includes a casing 12 of generally elongated, rectangular configuration, with at least the bottom surface 14 of the casing being flat for application against the slope or inclined surface to be checked or measured.

A circular reservoir 16 is included within the casing 12 and is disposed with its central axis lying in a plane that is parallel to the flat bottom surface 14 of the casing and extending transversely with respect to the longitudinal axis of the casing 12. As seen in Fig. 3, the reservoir 16 preferably has a bulbous peripheral portion 18 connecting together the outer edges of relatively closely spaced apart parallel side walls 20 which have hubs 22 at the centers thereof. The reservoir 16 is adapted to contain a body 24 of electrical conducting liquid, for example, mercury or any other suitable conducting liquid, occupying one half of the interior volume of the reservoir, so that the body of liquid 24 has a free surface 26 at a level passing through the center of the reservoir.

It is apparent that, when the bottom surface 14 of the casing 12 extends horizontally, the free surface 26 of the electrical conducting liquid will be parallel to the bottom surface of the casing, and that, as the bottom surface 14 is inclined relative to the horizontal, the free surface 26 remains horizontal and the angle included between the free surface of the body of electrical conducting liquid and the bottom surface 14 of the casing will be equal to the inclination of the casing.

A shaft 28 is rotatably journaled in the hubs 22 of the reservoir 16, and suitable packing glands 30 are provided in the hubs to prevent leakage of the electrical conducting liquid 24 from the reservoir around the rotatable shaft 28. Arms 32 and 34 extend radially, in generally diametrically opposed directions, from the shaft 28 through the narrow space between the side walls 20 of the reservoir and into the bulbous peripheral portion 18. Contact points 36 and 38 depend from the free ends of the arms 32 and 34, respectively, and are aranged so that a line drawn from the tip of contact point 36 to the tip of contact point 38 will pass through the axis of rotation of the shaft 28. Thus, the tips of the contact points 36 and 38 will engage the free surface 26 of the electrical conducting liquid only when the shaft 28 is rotatably disposed with respect to the casing 12 so that the line passing through the tips of the contact points and the axis of the shaft 28 lies in the horizontal plane of the surface 26. The contact points 36 and 38 may be formed of carbon, silver or the like to prevent electrolysis resulting from their intermittent contact with the body of electrical conducting liquid. The arms 32 and 34 are preferably also formed of an electrical conducting material and are insulated from each other, at the shaft 28, where conductors 40 and 42 are respectively connected to the arms 32 and 34.

The contact points 36 and 38 cooperate with the free surface 26 of the body of electrical conducting liquid to control the opening and closing of an electrical circuit for energizing a signal device included in the clinometer 10. In the illustrated embodiment of the invention, the signal device is represented by a light bulb 44 received in a suitable receptacle 46 at one end of the casing 12 and projecting from the latter within a suitably protected domed glass cover 48. The source of current for energizing the light bulb 44 is preferably in the form of a dry cell battery pack 50 which is mounted in a suitable support 52 within the casing 12 and can be inserted and removed through an opening at the end of the casing remote from the light bulb 44 and normally closed by a cover plate 54.

As seen particularly in Fig. 5, the electrical circuit for energizing the light bulb 44 may have the conductor 42 connected to one terminal of the battery pack 50, while the conductor 40 is connected to the central contact of the light bulb receptacle 46. Further, a conductor 56 extends between the base or shell of the receptacle 46 and the other terminal of the battery pack and preferably has an on-off toggle switch 58 interposed therein so that the light bulb can be energized only when the contacts of the switch 58 are closed and both contact points 36 and 38 simultaneously engage the free surface 26 of the body 24 of conducting liquid.

Assuming that the shaft 28 is rotatably disposed so that the line extending through the tips of both contact points 36 and 38 is parallel to the bottom surface 14 of the casing, it is apparent that the circuit for energizing the bulb 44 will be completed through the contact points and the body 24 of conducting liquid only when the surface 14 of the casing lies in a horizontal plane. With such a setting of the shaft 28 and contact points 36 and 38, which corresponds to the use of the clinometer as a level, inclination of the bottom surface 14 of the casing will similarly incline the line passing through the tips of both contact points, while the free surface 26 of the conducting liquid remains horizontal, so that one or the other of the contact points will be spaced from the surface 26 to interrupt the electrical energizing circuit of the light bulb 44.

If the shaft 28 is angularly adjusted relative to the casing 12 so that a predetermined angle is included between the flat bottom surface 14 and the line passing through the tips of the contact points 36 and 38, the latter will simultaneously engage the free surface 26 of the conducting liquid to complete the electrical energizing circuit of the light bulb 44 only when the bottom surface 14 of the casing is inclined relative to the horizontal by the same predetermined angle. In accordance with the present invention, mechanism provided for angularly adjusting the shaft 28 is operatively associated with an arrangement indicating, at all times, the angle included between the flat bottom surface 14 of the casing and the line passing through the tips of the contact points 36 and 38.

In the illustrated embodiment of the invention, the mechanism for angularly adjusting the shaft 28 includes a worm gear 60 fixed on the shaft 28 and meshing with a worm 62 on a drive shaft 64 that extends longitudinally within the casing 12 and projects from the end of the latter remote from the light bulb 44. A knurled knob 66 is fixed on the projecting end of the drive shaft 64 and can be manually rotated for effecting the required angular adjustment of the shaft 28.

The shaft 64 further has a worm 68 along a substantial portion of the length thereof meshing with an internally threaded follower nut 70 which has a lateral extension 72 projecting slidably through a longitudinal slot 74 in an adjacent side wall 76 of the casing 12 (Figs. 1 and 4) so that the follower nut 70 is held against rotation and moves axially along the worm 68 in response to rotation of the drive shaft 64. Preferably, the pitch of the worm 68 is substantially greater than the pitch of the worm 62 so that a relatively small angular displacement of the shaft 28 and the contact points 36 and 38 will be accompanied by a relatively large linear displacement of the follower nut 70. A scale 78, calibrated in degrees, is provided on the side wall 76 of the casing along the slot 74 and cooperates with a vernier index 80 formed by a flange on the free edge of the extension 72 and having vernier graduations, not shown. The follower nut 70 is arranged on the worm 68 so that, when the vernier 80 is centered along the slot 74, as in Fig. 1, the shaft 28 and contact points 36 and 38 are angularly disposed with the line passing through the tips of the contact points being parallel to the surface 14 of the casing. It is apparent that, as the shaft 64 is rotated in one direction or the other to incline the line extending through the tips of contact points 36 and 38 with respect to the surface 14, the vernier index 80 will move along the scale 78 and cooperate with the latter to indicate the extent of such inclination.

When the clinometer 10 is to be employed as a level, the knob 66 is rotated until the vernier index 80 is opposite the indication for zero degrees on the scale 78. Then, the light bulb 44 will be illuminated only when the surface, against which the bottom surface 14 is applied, is horizontally disposed. If it is desired to measure the angle of an inclination or slope, the surface 14 is applied against the slope and the knob is rotated until the light bulb is illuminated, whereupon the vernier index 80 and scale 78 will indicate the angle of the slope. If a member is to be installed at a predetermined angle from the horizontal, the knob 66 is rotated until the vernier and scale indicate that the clinometer is set for that predetermined angle. Then, the surface 14 of the casing is applied against the member to be erected and the latter is angularly adjusted to the position where the light bulb 44 is illuminated.

It is apparent that, in using the described electrical clinometer, the illumination of the light bulb 44 clearly and accurately indicates when the casing is disposed either level or at the desired angle to the horizontal so that there is no necessity to closely observe the condition of a spirit tube, as in previous clinometers. Further, the clinometer embodying the present invention is easily adjustable and, in view of the relatively great pitch of the worm 68, provides an expanded scale that can be accurately read, even when working in close or crowded locations.

It is also to be noted that, by reason of the relatively great distance between the contact points 36 and 38, a slight angular displacement of the contact points relative to the surface 26 of the conducting liquid will produce a relatively large displacement of the contact points in the directions generally normal to the surface 26 thereby increasing the sensitivity and accuracy of the indication. Further, the described configuration of the reservoir 16 tends to accumulate a major portion of the body of liquid 24 within the bulbous peripheral portion 18 of the reservoir for cooperation with the contact points 36 and 38 thereby reducing the volume of mercury required, as compared with a circular reservoir of uniform cross-section, so that the effects of inertia on the body of conducting liquid are correspondingly reduced to ensure that the free surface 26 will readily remain horizontal as the casing 12 is angularly displaced.

Although an illustrative embodiment of the invention has been described in detail herein and shown in the accompanying drawing, it is to be understood that the invention is not limited to that precise embodiment, and that various changes and modifications may be effected in the latter without departing from the scope or spirit of the invention as defined in the appended claims.

What is claimed is:

1. A clinometer or the like for determining the angle of a slope; comprising a casing having a straight longitudinal surface adapted to be applied against the slope, a reservoir in said casing containing a body of electrical conducting liquid having a free surface which remains horizontal as said surface of the casing is angularly displayed from the horizontal, an electrically operated signal device, an electrical circuit for operating said signal device and having contact points interposed therein and cooperating with said body of electrical conducting liquid so that said circuit is completed and said signal device is thereby operated only when said contact points simultaneously engage said free surface of the liquid, adjusting means operative to angularly displace said contact points with respect to said surface of the casing thereby to vary the inclination of the casing at which said contact points simultaneously engage the free surface of the liquid, and indicating means responsive to said adjusting means and operative to indicate the inclination of said surface of the casing at which said contact points will simultaneously engage the conducting liquid and cause operation of said signal device.

2. A clinometer or the like for determining the angle of a slope; comprising a casing having at least one straight longitudinal surface adapted to be applied against the slope to be measured, a reservoir in said casing containing a body of electric conducting liquid having a free surface, two contacts movable in a longitudinal plane that is perpendicular to the plane of said straight longitudinal surface of the casing and being disposed symmetrically at opposite sides of the transverse medial line of said free surface of the liquid on a line passing through said transverse medial line so that said contacts simultaneously engage said free surface only when said line through the contacts lies in the plane of said free surface, an electrically operated signal device, an electrical circuit for operating said signal device and having said contacts interposed therein so that said circuit is completed through said body of electrical conducting liquid only when said two contacts simultaneously engage said free surface of the liquid, and means operative to move said contacts oppositely about said transverse medial line of the free surface thereby to vary the angular relationship between said line through the contacts and said straight longitudinal surface of the casing for determining the angle of said straight surface of the casing from the horizontal at which said contacts will simultaneously engage the free surface of the liquid and cause operation of said signal device.

3. A clinometer or the like for determining the angle of a slope; comprising a casing having at least one straight longitudinal surface adapted to be applied against the slope to be measured, a reservoir in said casing containing a body of electrical conducting liquid having a free surface, two contacts movable in a longitudinal plane that is perpendicular to the plane of said straight longitudinal surface of the casing and being disposed symmetrically at opposite sides of the transverse medial line of said free surface of the liquid on a line passing through said transverse medial line so that said contacts simultaneously engage said free surface only when said line through the contacts lies in the plane of said free surface, an electrically operated signal device, an electrical circuit for operating said signal device and having said contacts interposed therein so that said circuit is completed through said body of electrical conducting liquid only when said two contacts simultaneously engage said free surface of the liquid, means operative to move said contacts oppositely about said transverse medial line of the free surface thereby to vary the angular relationship between said line through the contacts and said straight longitudinal surface of the casing for determining the angle of said straight surface of the casing from the horizontal at which said contacts will simultaneously engage the free surface of the liquid and cause operation of said signal device, and indicating means responsive to said means moving the contacts and operative to show the angle of said straight surface of the casing relative to the horizontal at which operation of said signal device will occur.

4. A clinometer or the like for determining the angle of a slope; comprising a casing having at least one straight longitudinal surface adapted to be applied against the slope to be measured, a generally circular reservoir in said casing disposed with its central axis extending parallel to the plane of said surface of the casing and transversely with respect to the latter, a body of electrical conducting liquid half-filling said reservoir so that the center of the latter lies in the free surface of the liquid, two contacts at diametrically opposed locations in said reservoir and movable together about the central axis of the latter so that said contacts simultaneously engage said free surface of the conducting liquid only when the diametrical line extending through both contacts is horizontally disposed, an electrically operated signal device on said casing, an electrical circuit for operating said signal device and having said contacts interposed therein so that the circuit is completed through said body of electrical conducting liquid only when said contacts simultaneously engage said free surface of the liquid, and means for angularly adjusting said contacts about said central axis of the reservoir thereby to vary the angle of said straight longitudinal surface of the casing relative to the horizontal at which said signal device is operated.

5. A clinometer or the like for determining the angle of a slope; comprising a casing having at least one straight longitudinal surface adapted to be applied against the slope to be measured, a generally circular reservoir in said casing disposed with its central axis extending parallel to the plane of said surface of the casing and transversely with respect to the latter, a body of electrical conducting liquid half-filling said reservoir so that the center of the latter lies in the free surface of the liquid, two contacts at diametrically opposed locations in said reservoir and movable together about the central axis of the latter so that said contacts simultaneously engage said free surface of the conducting liquid only when the diametrical line extending through both contacts is horizontally disposed, an electrically operated signal device on said casing, an electrical circuit for operating said signal device and having said contacts interposed therein so that the circuit is completed through said body of electrical conducting liquid only when said contacts simultaneously engage said free surface of the liquid, means for angularly adjusting said contacts about said central axis of the reservoir thereby to vary the angle of said straight longitudinal surface of the casing relative to the horizontal at which said signal device is operated, and indicating means responsive to said angular adjusting means to show the angle included between said straight longitudinal surface of the casing and the diametrical line through said contacts, thereby indicating said angle of said straight longitudinal surface relative to the horizontal at which said signal device is operated.

6. A clinometer or the like for determining the angle of a slope; comprising a casing having at least one straight longitudinal surface adapted to be applied against the slope to be measured, a generally circular reservoir in said casing disposed with its central axis extending parallel to the plane of said surface of the casing and transversely with respect to the latter, a body of electrical conducting liquid half-filling said reservoir so that the center of the latter lies in the free surface of the liquid, two contacts at diametrically opposed locations in said reservoir and movable together about the central axis of the latter so that said contacts simultaneously engage said free surface of the conducting liquid only when the diametrical line extending through both contacts is horizontally disposed, an electrically operated signal device on said casing, an electrical circuit for operating said signal device and having said contacts interposed therein so that the circuit is completed through said body of electrical conducting liquid only when said contacts simultaneously engage said free surface of the liquid, a shaft rotatable coaxially with said central axis of the reservoir and having radial arms extending therefrom and carrying said contacts, and manually actuated means for angularly displacing said shaft about the latter's axis thereby to vary the angular relationship of said straight longitudinal surface of the casing relative to the horizontal at which operation of said signal device occurs.

7. A clinometer or the like for determining the angle of a slope; comprising a casing having at least one straight longitudinal surface adapted to be applied against the slope to be measured, a generally circular reservoir in said casing disposed with its central axis extending parallel to the plane of said surface of the casing and transversely with respect to the latter, a body of electrical conducting liquid half-filling said reservoir so that the center of the latter lies in the free surface of the liquid, two contacts at diametrically opposed locations in said reservoir and movable together about the central axis of the latter so that said contacts simultaneously engage said free surface of the conducting liquid only when the diametrical line extending through both contacts is horizontally disposed, an electrically operated signal device on said casing, an electrical circuit for operating said signal device and having said contacts interposed therein so that the circuit is completed through said body of electrical conducting liquid only when said contacts simultaneously engage said free surface of the liquid, a shaft rotatable coaxially with the central axis of said reservoir and having radial arms extending therefrom and carrying said contacts, a worm gear on said shaft, a manually rotatable drive shaft journaled in said casing, a first worm on said drive shaft meshing with said worm gear to transmit the rotation of said drive shaft to said shaft carrying the contacts, a second worm on said drive shaft, a follower engaging said second worm to move axially in response to rotation of said drive shaft, a scale on said casing calibrated in degrees and extending parallel to the axis of said drive shaft, and an index carried by said follower and cooperating with said scale to indicate the angular relationship of said straight longitudinal surface of the casing to the horizontal at which said signal device is operated.

8. A clinometer or the like as in claim 7; wherein said second worm has a pitch substantially greater than the pitch of said first worm so that rotation of said drive shaft through a predetermined angle will effect a relatively small angular displacement of said contacts and a relatively large linear movement of said index along the scale, whereby the latter can be longitudinally expanded for easy and accurate reading of the indication given thereby.

9. A clinometer or the like as in claim 7; wherein said reservoir has relatively closely spaced apart side walls between which said arms extend and a bulbous outer peripheral portion containing a substantial major portion of the body of electrical conducting liquid contained in the reservoir, said contacts being engageable with said free surface of the liquid in said bulbous peripheral portion of the reservoir.

References Cited in the file of this patent

FOREIGN PATENTS 416,057    France _____ July 28, 1910